(12) United States Patent
Ziegler

(10) Patent No.: US 8,413,680 B2
(45) Date of Patent: Apr. 9, 2013

(54) FLUID DISTRIBUTION APPARATUS

(75) Inventor: Dan J. Ziegler, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 1181 days.

(21) Appl. No.: 12/271,766

(22) Filed: Nov. 14, 2008

(65) Prior Publication Data

US 2010/0122743 A1    May 20, 2010

(51) Int. Cl.
*F16L 41/00* (2006.01)
*F16L 43/00* (2006.01)
*B23B 51/06* (2006.01)

(52) U.S. Cl. .......... 137/561 A; 137/597; 137/884; 285/179; 408/56

(58) Field of Classification Search ........ 137/561 A, 137/561 R, 597, 884; 285/179; 408/56
See application file for complete search history.

(56) References Cited

U.S. PATENT DOCUMENTS

| | | | |
|---|---|---|---|
| 3,664,372 A * | 5/1972 | Marshall | ............. 137/552 |
| 4,465,411 A | 8/1984 | Boyce, Jr. et al. | |
| 6,065,910 A | 5/2000 | Egawa et al. | |
| 6,241,432 B1 | 6/2001 | Sasanecki | |
| 6,772,042 B1 | 8/2004 | Warren et al. | |
| 6,994,111 B2 * | 2/2006 | Cox | ............. 137/561 A |
| 2003/0029778 A1 * | 2/2003 | Vedrine | ............. 208/347 |
| 2008/0060182 A1 | 3/2008 | Wawrzyniak | |
| 2008/0098954 A1 | 5/2008 | Banks | |

\* cited by examiner

*Primary Examiner* — Craig Schneider
*Assistant Examiner* — Atif Chaudry
(74) *Attorney, Agent, or Firm* — Liell & McNeil Attorneys PC

(57) ABSTRACT

A fluid distribution apparatus for use in a cutting or shaping machine to facilitate chip breaking and cooling a variety of different diameter gear tools and workpieces when machining a workpiece is described. The fluid distribution apparatus includes a manifold block having a top face and a bottom face, with the top face including a seating surface adapted to be seated against an attachment surface of the machine. The apparatus also includes mounting holes in the top face for fastening engagement to the cutting machine, at least one inlet passage for connection to at least one fluid delivery nozzle, and a plurality of outlet flow passages.

13 Claims, 3 Drawing Sheets

FLUID DISTRIBUTION APPARATUS

TECHNICAL FIELD

The present disclosure relates generally to a machine cutting systems, and more particularly to the use of a fluid distribution apparatus for directing a continuous flow of fluid to a workpiece to facilitate consistent cooling during machine processing operations.

BACKGROUND

Machining operations of various configured metal workpieces are a standard throughout the world, and are especially common with vehicular components. These operations include shaping, boring, drilling, milling, or other metal cutting or turning operations executed with various types of cutting tools. As the machining operations progress, fluid is typically supplied to the cutting tool of the machine while it is machining a workpiece, for lubricating and cooling the cutting tool, as well as flushing chips of workpiece materials from it and out of its path of travel, to increase machine efficiency and prolong the life of the cutting tool by preventing excessive chip buildup on the tool.

In theory, chips that are rather short fall to the bottom of the machining center, away from the tool and workpiece. However, in practice, these chips can become very long, stringy, and curly, and create enormous machining issues.

While the formation of these long chips when using conventional manually operated machine tools may be of a slightly lesser concern, since the chips can be readily removed by the operator during their formation, there are still safety hazards because the long curling chips often form growing bundles which can cut the operator's skin while attempting to remove them. Additionally, when using a computer programmed or other automated machine tools, especially, when the machine tools are enclosed in a housing, access to the workpiece for breaking or removing the chips is restricted so as to present a problem with to the respect to the generation and removal of the long continuous chips.

Further, in gear cutting operations, the cutting machine system may produce excess heat by the action of the cutting tool against the workpiece. This heat adversely influences the cutting tool and or the material being machined. It is especially valuable to have constant flow of fluid across the surface of the cutting edges of the workpiece and the cutting tool to keep the tool as well as the workpiece cool. Typically, the cutting system has one or two fluid hoses within it that each direct a flow of fluid to a specific area of the tool. These nozzles enable fluid to be delivered to a certain portion or area of the cutting surface of the tool while it is engaged with the workpiece during machining.

Over the years, engineers have devised a long list of cooling strategies intended to direct flow in the general area of metalworking or cutting operations. In fact, the use of one or more cooling nozzles dates far back in the metallurgical cutting arena. From those early dates forward, numerous manufacturers of metal workpieces have included some cooling strategy to inhibit chip buildup or over heating of the work tool. Many of these nozzles were set to distribute excess fluid at excessive rates, causing a lot of waste. Many of the nozzle configurations are particular to the specific workpiece geometry features, and are not easily transferable to different designs or sizes. The one or two nozzle cooling strategy for one cutting machine may be totally ineffective and inappropriate for a different cutting machine or tool. With every new design, new cooling configurations and strategies must be devised in order to specifically address the needs and geometry of each new part, which can lead to enormous production costs, poor workpiece quality, and increased waste.

The present disclosure is directed to overcoming one or more of the issues set forth above.

SUMMARY

In one aspect, the present disclosure is directed to a fluid distribution apparatus for use in a cutting or shaping machine to facilitate chip breaking and providing cooling to a variety of different diameter gear tools and workpieces when machining a workpiece. The fluid distribution apparatus includes a manifold block having a top face and a bottom face, with the top face including a seating surface adapted to be seated against an attachment surface of the machine. The apparatus also includes mounting holes in the top face for fastening engagement to the cutting machine, at least one inlet passage for connection to at least one fluid delivery nozzle, and a plurality of outlet flow passages.

In another aspect, the present disclosure is directed to a method for manufacturing a fluid distribution apparatus for use in a cutting or shaping machine to facilitate chip breaking and provide cooling to a variety of different diameter gear tools and workpieces when machining a workpiece including the steps of calculating the pitch diameter of all gear tools to be used in the machine, calculating the pitch diameter of all workpieces to be machined, overlaying the compilation of all pitch diameters to determine the required arc pattern geometry, machining a manifold block having a top face and a bottom face, the top face including a seating surface adapted to be seated against an attachment surface of the machine, boring at least one inlet port on a side face of the manifold block, and boring a plurality of outlet flow passages opening onto the bottom face of the manifold block, with the plurality of outlet flow passages in the required arc pattern and in fluid communication with the at least one inlet passage.

DETAILED DESCRIPTION

Embodiments of the disclosure will be described with reference to the accompanying drawing figures wherein like numbers represent like elements throughout. Further, it is to be understood that the phraseology and terminology used herein is for the purpose of description and should not e regarded as limiting. The use of "including," "comprising," or "having" and variations thereof herein are meant to encompass the items listed thereafter and equivalents thereof as well as additional items. The terms "connected" and "coupled" are used broadly and are not restricted to physical or mechanical connections or couplings.

Embodiments of the disclosure provide a fluid distribution apparatus for use in a cutting or shaping machine to facilitate chip breaking and cooling a variety of different diameter gear tools and workpieces when machining a workpiece. Gear shaping machines normally employ a gear, which is integrally formed on the head of the machine. Gear shapers have cutters that look similar to a gear and rotate slowly as they reciprocate against a metal blank which also rotates slowly, whereby the cutter cuts teeth on the blank. A gear cutting or shaping tool is mounted in the machine 10.

Figure 1:
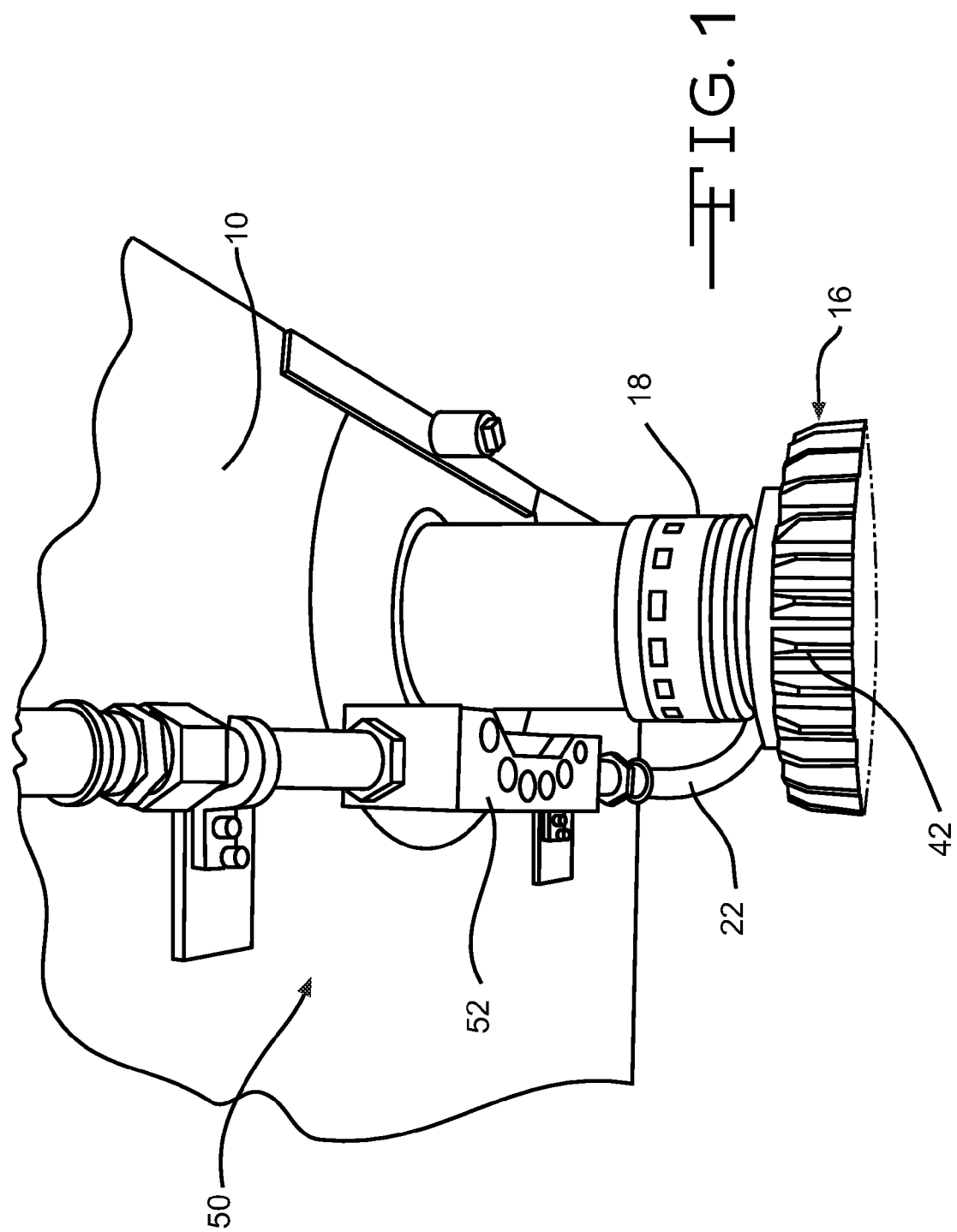
FIG. 1 is a diagrammatic illustration of a fluid distribution apparatus in a gear cutting or shaping machine.

FIG. 1 illustrates an embodiment of a machine 10 in accordance with the present disclosure. In the gear shaping or cutting machine shown in FIG. 1 the generation or shaping of gear teeth is, as in the conventional case, performed by vertically reciprocating a head to allow it to cut into the work, and further imparting relative rotations to the cutter head 18 and the workpiece 30. The machining conditions are determined so that predetermined teeth are generated or shaped on the workpiece 30. Cutting oil or fluid 25 is supplied as the cutting or shaping operation is performed.

The machine 10 of the present disclosure may be an automated version of a traditional gear shaping machine, generally employing a cutter head 18 integratedly formed on the end of a shank. A tool may be mounted to the machine 10 and reciprocated in a restrained path between a pair of longitudinal spaced positions L. A workpiece 30 is typically held in a workholding device (chuck, center, collet, etc) and is rotated by the spindle motor (not shown). On a typical gear-shaping machine, the gear tool 16 rotates in one direction, while simultaneously moves up and down along the radial direction of the workpiece 30, and the machine 10 may optionally be enclosed in a housing (not shown) to confine machining fluid spray. The machine tool headstock or a spindle may oscillate along a feed advance path. The cutter head or workpiece holder motion may be provided using hydraulic, pneumatic, electromagnetic, piezoelectric or mechanical actuators, or the like.

The distribution apparatus 40 of the present disclosure compliments standard or automated cutting or shaping machines. The construction of the gear shaper tool 16 itself is substantially the same as a conventional style.

Computer Numeric Control (CNC) is an automated way of positioning a shaping or cutting work tool 16 and driving the workpiece rotation by computer controlling the multiple drive axes. Gear tools 16 used in shaping and cutting operations are generally circular with appropriate cutting edges or teeth 42 made of materials like hardened steels, tungsten carbide, and ceramics. These tools 16 may be coated to improve thermal resistance and durability, and are moved around the workpiece 30 by the machine axes to precisely shave off or remove material from the workpiece 30.

Typically cutting machines include one or more hoses and nozzles, which supply fluid to the cutting tool, directed angularly inward in the direction of the tool and workpiece. The fluid may be cutting oil, or water-soluble cutting fluid, or any other suitable type of fluid may be used, depending on the needs of the particular tool or metal workpiece being shaped. Anti-foaming agents may be used with the fluid as desired to prevent aeration and foaming of the fluid due to high pressure discharge. In addition, any other suitable cooling agent may be used in the system regardless of viscosity.

Generally a gear shaping tool is mounted in a vertically reciprocating ram for up and down as well as rotational motion. A gear blank is mounted on a bed that is rotated about a vertical axis as the cutting tool is rotated. For purposed of illustration, the machine is of conventional construction and moves the tool down in a cutting stroke, backs it away from the blank before returning it upwardly in a return stroke to a starting position and then advances the tool forward to the blank for a subsequent cutting stroke. In its return stroke, the tool and the workpiece may be rotated slightly at a speed ratio that is proportional or inversely proportional to their pitch diameters.

Figure 2:
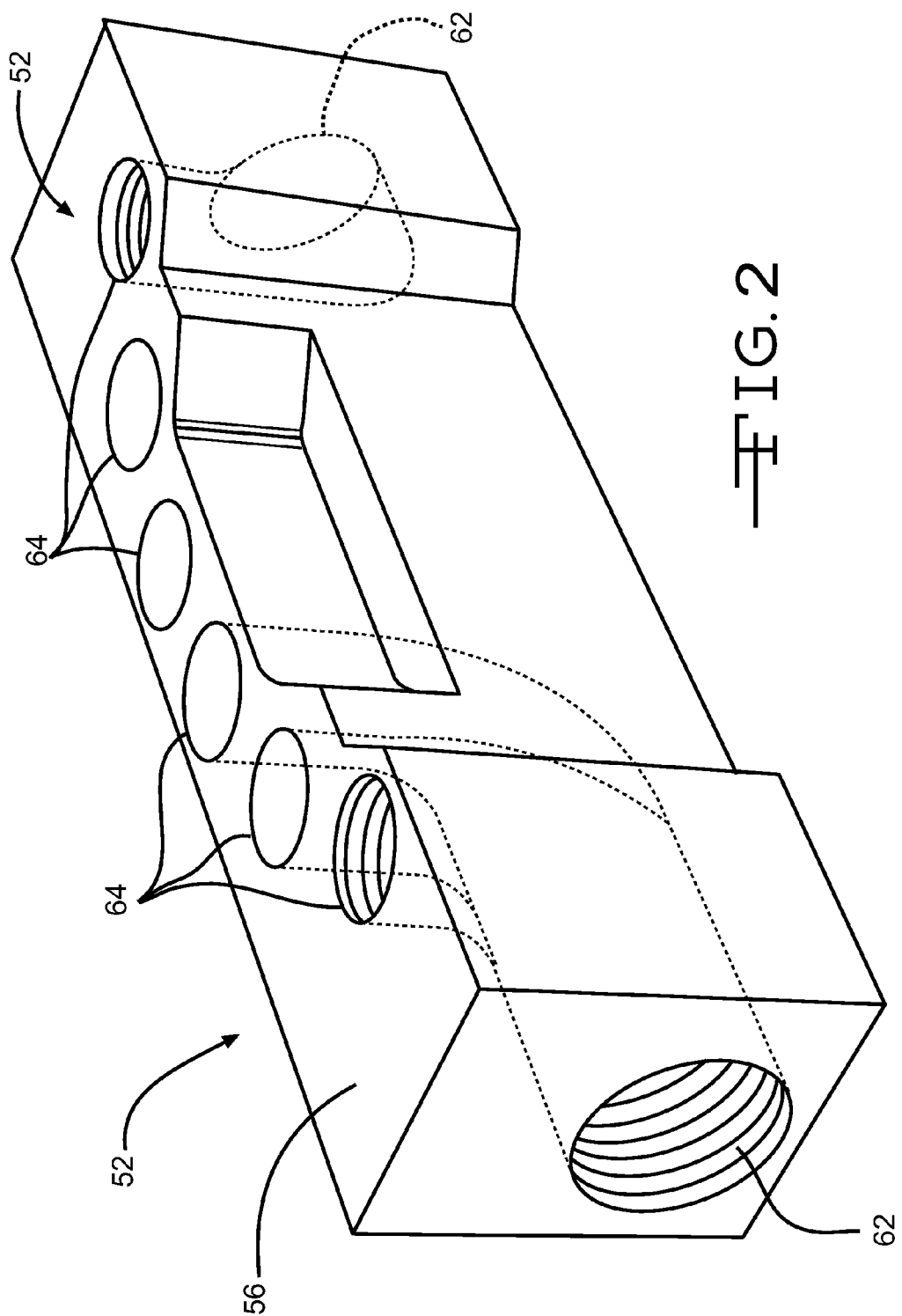
FIG. 2 is a front elevation view of an exemplary manifold block of the present disclosure; and, FIG. 3 is a top plan view of an exemplary manifold block of the present disclosure.
Figure 3:
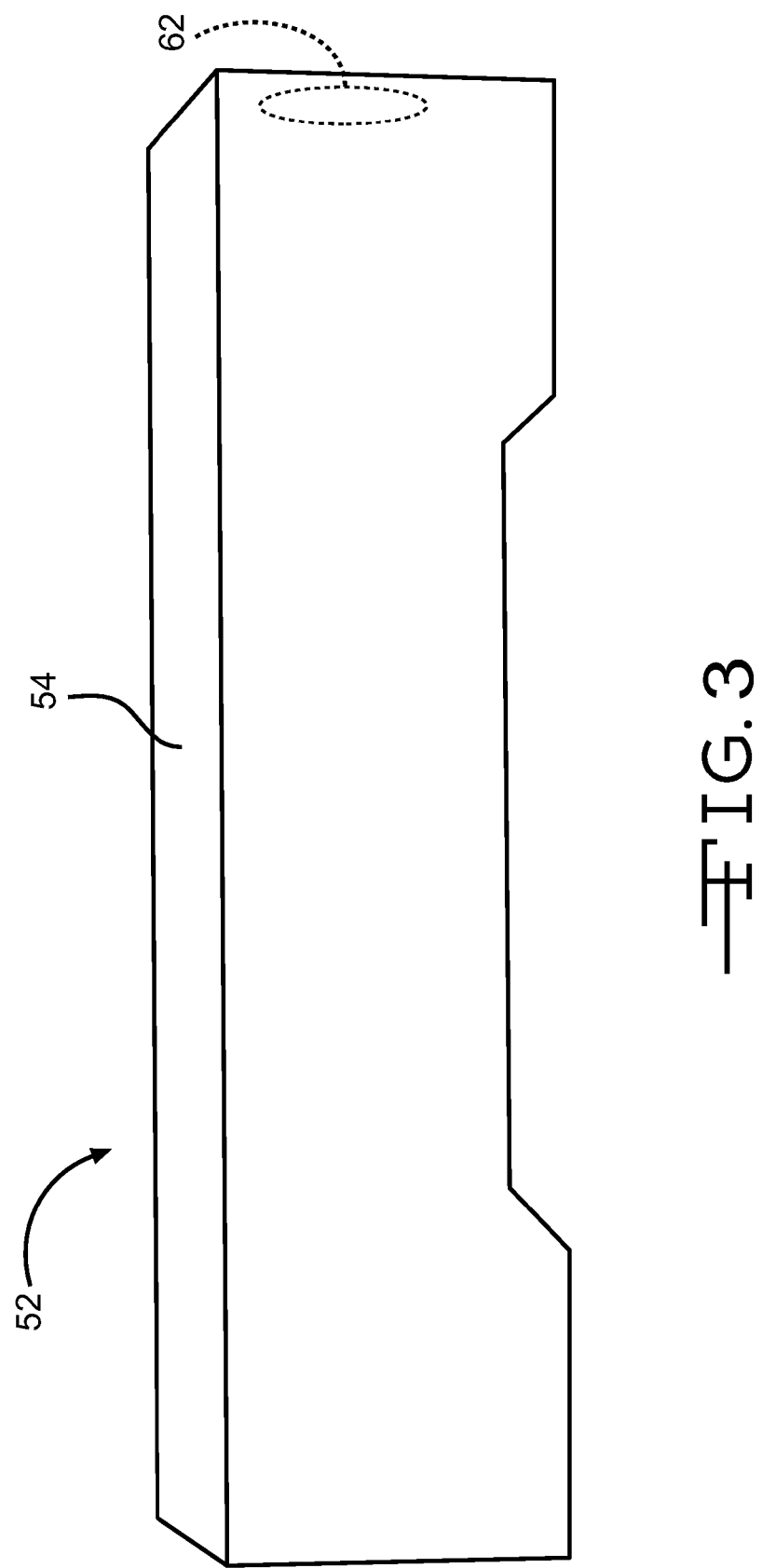

Referring now to FIGS. 2 and 3, there is shown respectively a front elevation view and a top plan view of an embodiment of the fluid distribution apparatus 50 of the present disclosure. The fluid distribution apparatus 50 includes a manifold block 52 for a metal cutting and shaping machine 10, and is designed to provide constant flow of fluid to a workpiece 30. The manifold block 52 may be cuboidal in shape. The cuboidal (or rectangular prism) shape of the manifold 52 mates to a portion of a surface of the head of the machine. In an embodiment the manifold block 52 has a top face 54 and a bottom face 56. The top face 54 may have a seating surface adapted for seating against a suitable surface in the work area of the cutting and shaping machine 10 where the manifold block 52 is mounted thereto. The manifold block 52 may be clamped or mechanically fastened to the cutting machine 10 using suitable mechanical fasteners. Existing machines may have drilled and tapped holes already available to accommodate an adjustable clamping system. Further, the manifold may be incorporated into the build of the machine and flow distribution aspect of the machine, or the manifold block 52 may have machine specific attachments for mounting. In alternate embodiments, the cooling manifold block 52 may have any other suitable shape. The manifold block 52 has at least one inlet passage 62 formed therein. The at least one inlet passages 62 are through bores which extend from at least one side of the manifold block 52. Where two or more inlet passages exist in the manifold block 52, they may be located on opposite faces from each other. In one embodiment, a plurality of outlet flow passages 64 are located in the bottom face 56 of the manifold block 52. Alternate embodiments may include any suitable number of straight flow passages. The at least one inlet passage openings 62 respectively formed in the manifold block 52 are generally threaded to allow mating with a suitable mechanical pipe fitting. However, as would be understood by one skilled in the art, the openings 62 may have any structure for receiving a port passage plug (not shown).

One opening of the at least one inlet flow passage 62 serves as an inlet to which a feed line of the system is removably connected. The opening 62 serves as an inlet to which a suitable fluid delivery nozzle 22 may be attached. The openings of each passage may be alternatively be used as either an inlet or an outlet, as desired. In an embodiment, the manifold block 52 has two inlet flow passage holes 62, to prevent loss of pressure that may occur in some flow settings from a single inlet.

The outlet flow passages 64 have a general elbow configuration. In an embodiment, the passages 64 have approximately a 90-degree bend. In alternate embodiments the manifold block 52 may use any suitable number of elbow passages 64 that are bent at any suitable angle. Each of the elbow passages 64 has an opening in the bottom face 56 and an opening inside of and through the manifold block 52, leading from the at least one inlet passages 62. Both openings may be threaded to accept a mating pipe fitting, and either opening may serve as an inlet and outlet.

Turning now to FIG. 3, where the bottom face 56 is illustrated, an optimal number of outlet flow passages 64 are shown. The flow passages 64 are generally in an arc pattern. The fluid distribution apparatus 50 allows for the path of the out coming fluid stream to be adjusted according to the flow needs for the particular sized gear cutting tool 16 and or workpiece 30. In one embodiment, the outlet flow passages 64 on one side of the arc pattern will receive fluid from the inlet passage 62 on its same side. In this embodiment, there may be an internal wall (not shown) that separates each set of outlet flow passages 64 according to its fluid delivery inlet port 62. The outer holes in the manifold block 52 arc pattern may be threaded for optionally receiving a passage plug. The plugs (not shown) provide a cost saving feature allowing the plugging of un-utilized passages when smaller cutters are operational. This allows for a single size manifold block 52 to be used, regardless of the cutter tool or workpiece diameter, without waste. The plugs allow for narrowing of the flow of fluid or oil accordingly, by simply inserting one or more threaded plugs.

In an exemplary methodology, in order to determine the optimal location of the hole pattern of the elbow flow passages, the pitch diameters of the various ring gears to be run on the machine 10 are calculated. Next, the pitch diameters of all the cutters or gear tools 16 that are to be used must be calculated, and then these diameters must be over-laid together at the point where the cutting action will occur during processing. Overlaying the cutter dimensions over the workpiece dimensions, gives the total area that needs to be covered, regardless of which size workpiece is to be processed. Thus providing the entire cutting area needed to be covered by the fluid distribution apparatus 50.

The outlet flow passage patterns 64 are mere examples of the multifarious types of patterns achievable. The different patterns are a function of the relative speed and feed velocities, based on machine and system efficiency, and part geometry. The different patterns are also a function of the length and depth of the cutting or shaping machine employed.

Additionally, the size or depth of the openings for the outlet flow passages 64 may be adjusted depending on the type of material being machined or shape and size of the part. The disclosed method would be appropriate to numerous types of machining operations, as would be understood by one skilled in the art.

Industrial Applicability

It will be seen that the present disclosure provides a mechanism by which undesirable ribbon-shaped long continues stringy cuttings or chips generated during the machining of a workpiece can be satisfactorily and automatically eliminated by using the same CNC tooling to pre-scribe the workpiece as is later used for milling or cutting the workpiece. Accordingly, the disclosed innovation may be seen as being a machining method, apparatus or accessory for existing CNC machine tools to increase their productivity.

However, the disclosure as defined by the appended claims is deemed to cover various modifications of the embodiments disclosed herein, according to the scope of the claims, which modifications are deemed covered as equivalent structures as will be apparent to those of ordinary skill in the machine tool art. This method may be applicable to any cutting machine having automated capabilities. The method of this disclosure may also be particularly beneficial in boring, milling, and turning applications.

It will be appreciated that the foregoing description provides examples of the disclosed apparatus. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely, unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A fluid distribution apparatus for use in a cutting or shaping machine, comprising:
    a manifold block having a top face and a bottom face; the top face configured to mount to an attachment surface of the machine;
    two inlet passages for connection to at least one fluid delivery nozzle;
    a plurality of outlet flow passages arranged in an arc pattern;
    the plurality of outlet flow passages being in fluid communication with the two inlet passages; and
    wherein each of the outlet flow passages cooperates with one of the two inlet passages to define a 90-degree angle;
    wherein the plurality of outlet flow passages open onto the bottom face of the manifold block.

2. The fluid distribution apparatus of claim 1, wherein the arc pattern of the plurality of outlet flow passages is calculated from a compilation of the pitch diameter geometry data of the gear tools to be used in the machine.

3. The fluid distribution apparatus of claim 1, wherein the arc pattern of the plurality of outlet flow passages is calculated from a compilation of the pitch diameter geometry data of the workpieces to be machined.

4. The fluid distribution apparatus of claim 1, wherein the plurality of outlet flow passages are six elbow passages.

5. A fluid distribution apparatus for use in a cutting or shaping machine, comprising:
    a manifold block having a top face and a bottom face; the top face configured to mount to an attachment surface of the machine;
    two inlet passages for connection to at least one fluid delivery nozzle;
    a plurality of outlet flow passages arranged in an arc pattern;
    the plurality of outlet flow passages being in fluid communication with the two inlet passages; and
    wherein each of the outlet flow passages cooperates with one of the two inlet passages to define a 90-degree angle;
    wherein two of the plurality of outlet flow passages at opposite ends of the arc pattern are threaded for removably receiving port plugs.

6. A gear cutting machine comprising:
    a cutting head;
    a cutting tool extending from the cutting head and being rotatable and simultaneously movable vertically up and down for shaping a workpiece to a specified gear part geometry in a cutting area; and
    a fluid distribution apparatus with a manifold block configured to deliver a cooling agent to the cutting tool and the workpiece in the entire cutting area from a plurality of outlet flow passages arranged in an arc pattern.

7. The gear cutting machine of claim 6 wherein each of the outlet flow passages turns through a 90 degree bend from an inlet flow passage.

8. The gear cutting machine of claim 6 wherein two of the outlet flow passages located at opposite ends of the arc pattern are threaded.

9. The gear cutting machine of claim 6 wherein the arc pattern is a function of the part geometry.

10. The gear cutting machine of claim 6 wherein the manifold block has six outlet flow passages arranged in the arc pattern.

11. The gear cutting machine of claim 6 wherein the outlet openings open through a bottom face of the manifold block; the manifold block includes a top face mounted in seating contact with surface in a work area of the gear cutting machine.

12. The gear cutting machine of claim 6 wherein the manifold block defines two inlet flow passages that are fluidly connected to the outlet passages and open through opposite side faces of the manifold block that are located beyond opposite ends of the arc pattern, respectively.

13. The gear cutting machine of claim 6 wherein each of the outlet flow passages turns through a 90 degree bend from an inlet flow passage;
- two of the outlet flow passages at opposite ends of the arc pattern are threaded;
- the arc pattern is a function of the part geometry;
- the manifold block has six outlet flow passages arranged in the arc pattern;
- the outlet openings open through a bottom face of the manifold block;
- the manifold block includes a top face mounted in seating contact with surface in a work area of the gear cutting machine; and
- wherein the manifold block defines two inlet flow passages that are fluidly connected to the outlet passages and open through opposite side faces of the manifold block beyond opposite ends of the arc pattern, respectively.

* * * * *